US008825290B2

(12) United States Patent
Terada et al.

(10) Patent No.: US 8,825,290 B2
(45) Date of Patent: Sep. 2, 2014

(54) VEHICLE POWER SOURCE DEVICE

(75) Inventors: Tomohiro Terada, Kanagawa (JP);
Kenji Sugihara, Tokyo (JP); Norihiko Kimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/000,759

(22) PCT Filed: Mar. 28, 2012

(86) PCT No.: PCT/JP2012/002158
§ 371 (c)(1),
(2), (4) Date: Aug. 21, 2013

(87) PCT Pub. No.: WO2012/132434
PCT Pub. Date: Oct. 4, 2012

(65) Prior Publication Data
US 2013/0325262 A1  Dec. 5, 2013

(30) Foreign Application Priority Data

Mar. 29, 2011 (JP) .................................. 2011-072274

(51) Int. Cl.
| G06F 7/00 | (2006.01) |
| B60R 16/033 | (2006.01) |
| B60L 3/00 | (2006.01) |
| B60L 11/18 | (2006.01) |
| H02J 7/00 | (2006.01) |

(52) U.S. Cl.
CPC ....... *B60R 16/033* (2013.01); *B60K 2350/1076* (2013.01); *B60L 11/1861* (2013.01); *B60L 2260/52* (2013.01); *B60L 2260/54* (2013.01); *H02J 7/0054* (2013.01); *B60L 3/003* (2013.01); *B60L 3/0046* (2013.01); *B60L 3/0084* (2013.01); *B60T 2270/60* (2013.01)
USPC ............ 701/36; 701/22; 340/425.5; 340/438; 340/455; 340/988; 280/80.1; 280/735; 410/9; 410/26; 180/275

(58) Field of Classification Search
CPC .................. B60K 2350/1076; B60L 11/1861; B60L 2250/16; B60L 2260/52; B60L 2260/54

USPC ........... 701/22, 36; 340/425.5, 438, 455, 988; 280/80.1, 735; 410/9, 26; 180/275
See application file for complete search history.

(56) References Cited

U.S. PATENT DOCUMENTS

| 5,499,182 A * | 3/1996 | Ousborne .................... 701/29.6 |
| 8,670,885 B2 * | 3/2014 | Gilman et al. ................. 701/22 |
| 2004/0124703 A1 | 7/2004 | Tani et al. |
| 2012/0179318 A1 * | 7/2012 | Gilman et al. ................. 701/22 |
| 2012/0179319 A1 * | 7/2012 | Gilman et al. ................. 701/22 |

FOREIGN PATENT DOCUMENTS

| JP | 10-287191 A | 10/1998 |
| JP | 2004-142662 A | 5/2004 |

(Continued)

OTHER PUBLICATIONS

International Search Report for PCT/JP2012/002158 dated Jun. 12, 2012.

*Primary Examiner* — McDieunel Marc
(74) *Attorney, Agent, or Firm* — Pearne & Gordon LLP

(57) ABSTRACT

A risk-degree setting unit (108) sets the degree of risk for the case where an inverter (103) performs conversion processing (inverter risk degree), and sets the degree of risk for the case where a storage battery (105) stores electrical energy (storage battery risk degree). A final output destination determination unit (109), based on the degrees of risk set by the risk-degree setting unit (108), determines the final output destination of electrical energy output from an electric motor (106), and controls the turning ON or OFF of a relay (110). The final output destination determination unit (109) turns the relay (110) ON when the storage battery (105) is determined as the final output destination of the electrical energy output from the electric motor (106), and turns the relay (110) OFF when the inverter (103) is determined as the final output destination of the electrical energy output from the electric motor (106).

11 Claims, 4 Drawing Sheets

(56) References Cited

FOREIGN PATENT DOCUMENTS

| JP | 2007-118945 A | 5/2007 |
| JP | 2008-024165 A | 2/2008 |
| JP | 2010-167960 A | 8/2010 |
| JP | 2010-228511 A | 10/2010 |

* cited by examiner

|  | INVERTER 103 | STORAGE CELL 105 |
|---|---|---|
| DEGRADATION OVER TIME | FIVE YEARS | THREE YEARS |
| PERMISSIBLE TEMPERATURE | 50°C | 45°C |
| PERMISSIBLE HUMIDITY | 70% | 65% |
| POWER RECEPTION CAPACITY | 100Wh | 2kWh |
| CURRENT RESISTANCE | 60 | 100 |
| DEGREE OF RISK AT TIME OF LEAKAGE OF ELECTRICITY | 200 | 500 |
| DEGREE OF SEVERITY AT TIME OF DAMAGE | 800 | ∞ |
| CONNECTION HARNESS RESISTANCE | 100A | 200A |

FIG. 2

|  | INVERTER 103 | STORAGE CELL 105 | ELECTRIC COMPRESSOR 111 | PTC HEATER 116 |
|---|---|---|---|---|
| DEGRADATION OVER TIME | FIVE YEARS | THREE YEARS | FIVE YEARS | FIVE YEARS |
| PERMISSIBLE TEMPERATURE | 50°C | 45°C | ~100°C |  |
| PERMISSIBLE HUMIDITY | 70% | 65% | ~100% | ~100% |
| POWER RECEPTION CAPACITY | 100Wh | 2kWh | ~6kWh | ~5kWh |
| CURRENT RESISTANCE | 60 | 100 | 20A | — |
| DEGREE OF RISK AT TIME OF LEAKAGE OF ELECTRICITY | 200 | 500 | 100 | 100 |
| DEGREE OF SEVERITY AT TIME OF DAMAGE | 800 | ∞ | 200 | 100 |
| CONNECTION HARNESS RESISTANCE | 100A | 200A | 50A | 50A |

FIG. 4

VEHICLE POWER SOURCE DEVICE

TECHNICAL FIELD

The present invention relates to a vehicle power supply apparatus.

BACKGROUND ART

Some conventional vehicle power supply apparatuses are configured to classify a plurality of electrical loads into a predetermined number of groups, then to distribute power supplied from a power supply is to each group in accordance with a priority level (group priority level) defined for the group and to distribute the power distributed to a specific group to each electrical load within the group in accordance with a priority level (load priority level) defined for the electrical load within the group (for example, see PTL 1). The group priority level and the load priority level are calculated based on information relating to the vehicle states such as a warm-up state of the vehicle and the external illuminance of the periphery of the vehicle.

CITATION LIST

Patent Literature

PTL 1
Japanese Patent Application Laid-Open No. 2004-142662

SUMMARY OF INVENTION

Technical Problem

In the above-described conventional vehicle power supply apparatuses, however, only the vehicle states such as the warm-up state of the vehicle and the external illuminance of the periphery of the vehicle are considered in distribution of the power, and the characteristics of each electrical load to which the power is distributed are not considered. Accordingly, in the above-described conventional vehicle power supply apparatuses, there is concern that the electrical load to which the power is distributed without taking the characteristics of the electrical load into consideration may not withstand the power and be damaged. In recent electric vehicles, the voltage of a storage battery used as the power source of an electric motor is high, and when the electrical load to which the power is distributed is damaged, a human body may be affected by an accident such as a leakage of electricity. In other words, in the above-described conventional vehicle power supply apparatuses, there is concern that the safety of the vehicle may not be maintained.

In addition, as described above, the degree of risk when using an electric vehicle is much higher than that when using a conventional vehicle. Accordingly, in recent electric vehicles, ensuring user's safety is one of the most important issues.

It is an object of the present invention is to provide a vehicle power supply apparatus capable of ensuring user's safety by maintaining the safety of the vehicle.

Solution to Problem

A vehicle power supply apparatus according to an aspect of the present invention is an apparatus to be installed in a vehicle, the apparatus including: an output section that outputs electrical energy; a plurality of electric components that process or accumulate the electrical energy; a setting section that sets a degree of risk for each of the plurality of electric components to process or accumulate the electrical energy; and a determination section that determines one of the plurality of electric components as a final output destination of the electrical energy based on the degree of risk for each of the plurality of electric components.

Advantageous Effects of Invention

According to the present invention, user's safety can be secured by maintaining the safety of a vehicle.

BRIEF DESCRIPTION OF DRAWINGS

FIG. 2 is a risk degree table according to an embodiment of the present invention;

FIG. 4 is a risk degree table according to a variation of an embodiment of the present invention.

DESCRIPTION OF EMBODIMENTS

Here, a vehicle power supply apparatus according to an embodiment of the present invention will be described with reference to the drawings.

Figure 1:
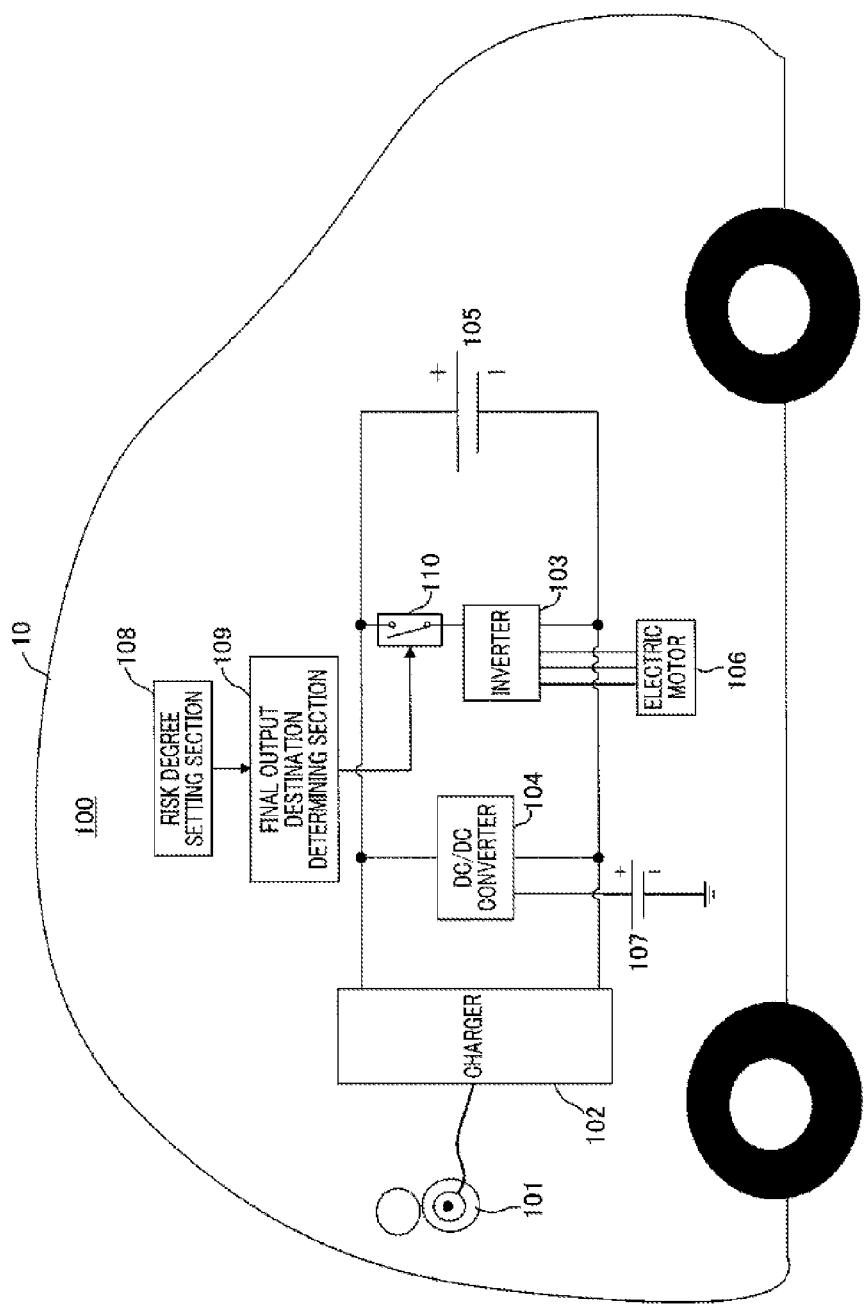
FIG. 1 is a block diagram that illustrates the configuration of a vehicle power supply apparatus according to an embodiment of the present invention.

FIG. 1 is a block diagram that illustrates the configuration of vehicle power supply apparatus 100 according to this embodiment.

As illustrated in FIG. 1, vehicle power supply apparatus 100 is installed to a vehicle 10. The vehicle power supply apparatus 100 includes: lid portion 101; charger 102; inverter 103; DC/DC converter 104; storage cell 105; electric motor 106; auxiliary battery 107; risk degree setting section 108; final output destination determining section 109; and relay 110.

Hereinafter, the operation at the time of charging storage cell 105 and the operation at the time of discharging of storage cell 105 will be separately described.

First, the operation at the time of charging storage cell 105 will be described.

<Operation at Time of Charging Storage Cell 105>

In vehicle power supply apparatus 100, a power supply plug (not illustrated in the drawing) is inserted from the outside of vehicle 10 into electrodes provided in lid portion 101, the electrodes are supplied with electrical energy, and the electrical energy can be accumulated in storage cell 105. In addition, in storage cell 105, as will be described later, electrical energy (regenerative energy) converted by electric motor 106 at the time of generating a regenerative braking force can be accumulated.

Lid portion 101 is attachable/detachable or openable/closeable by a user of vehicle 10. The user of vehicle 10 starts charging by inserting the power supply plug into lid portion 101 from the outside of vehicle 10. Lid portion 101 is provided with the electrodes. When the power supply plug is inserted, electrodes of the power supply plug and the electrodes of lid portion 101 are brought into contact with each other, and accordingly, electrical energy can be supplied from the outside of vehicle 10. From the power supply plug connected to a household power supply, for example, electrical energy of about AC 100 to 240 V is supplied.

The electrical energy supplied from the power supply plug through the electrodes provided in lid portion 101 is input to charger 102. Usually, the electrical energy supplied from the power supply plug is AC, and accordingly, charger 102 performs a conversion process in which AC electrical energy is converted into DC electrical energy, and the DC electrical energy is outputted. The electrical energy converted into DC is accumulated in storage cell 105.

DC/DC converter 104 performs voltage transformation of the DC electrical energy outputted from charger 102 and outputs transformed electrical energy. As described above, DC/DC converter 104 performs the voltage transformation process of electrical energy. The transformed electrical energy is accumulated in auxiliary battery 107.

A shaft of electric motor 106 is connected to a vehicle, shaft of driving wheels of vehicle 10 and generates a regenerative braking force by converting the kinetic energy of vehicle 10 into electrical energy. When a rotor provided in electric motor 106 is rotated by an external three (a rotation force of the vehicle shaft of driving wheels of vehicle 10), electric motor 106 serves as a power generator and generates electrical energy. Accordingly, when the kinetic energy according to the rotation of the vehicle shaft is converted into electrical energy, a regenerative braking force, which is a resistance force against the rotation of the vehicle shaft, is generated. Electric motor 106 outputs this electrical energy to inverter 103. This electrical energy is AC electrical energy.

Inverter 103 performs a conversion process in which the AC electrical energy outputted from electric motor 106 is converted into DC electrical energy, and the DC electrical energy is outputted. The converted DC electrical energy is accumulated in storage cell 105 through relay 110.

When turned on by final output destination determining section 109, relay 110 electrically connects inverter 103 and storage cell 105 to each other. On the other hand, when turned off by final output destination determining section 109, relay 110 electrically disconnects inverter 103 and storage cell 105 from each other. Accordingly, when relay 110 is turned on, the final output destination of the electrical energy outputted from electric motor 106 is storage cell 105. On the other hand, when relay 110 is turned off, the final output destination of the electrical energy outputted from electric motor 106 is inverter 103.

Storage cell 105 accumulates the DC electrical energy outputted from charger 102 and the DC electrical energy output from inverter 103. A secondary battery (for example, a nickel hydride rechargeable battery, a lithium ion rechargeable battery, or the like) having a high energy density or a high-capacity capacitor may be used as storage cell 105.

Risk degree setting section 108 sets the degree of risk (inverter risk degree) for inverter 103 to perform the above-described conversion process and the degree of risk (storage cell risk degree) for storage cell 105 to accumulate electrical energy and outputs a result of the setting to final output destination determining section 109. Each risk degree is set based on the degree of decrease in the safety of vehicle 10 in a case where each electric component of inverter 103 or storage cell 105 cannot withstand the load of electrical energy of a high voltage and is damaged. For example, in a case where the degree of decrease in the safety of vehicle 10 of a case where inverter 103 is damaged is higher than that of vehicle 10 of a case where storage cell 105 is damaged, the inverter risk degree is higher than the storage cell risk degree. In addition, the safety of vehicle 10 changes in accordance with the magnitude of the influence on a human body due to an electric shock or the like in a case where each electric component is damaged. In other words, the higher the degree of the influence on the human body is, the higher the degree of decrease in safely of vehicle 10 becomes.

Final output destination determining section 109 determines a final output destination of the electrical energy outputted from electric motor 106 based on each risk degree set by risk degree setting section 108 and controls the turning on/off of relay 110. In other words, final output destination determining section 109 turns on relay 110 in a case where the final output destination of the electrical energy output from electric motor 106 is determined to be storage cell 105. On the other hand, final output destination determining section 109 turns of relay 110 in a case where the final output destination of the electrical energy outputted from electric motor 106 is determined to be inverter 103.

Next, the operation at the time of discharging storage cell 105 will be described.

<Operation at Time of Discharging Storage Cell 105>

The electrical energy accumulated in storage cell 105, for example, is used as power for operating electric motor 106 as a power source for driving the driving wheels of vehicle 10. In a case where electric motor 106 is used as a motor, inverter 103 converts DC electrical energy accumulated in storage cell 105 into AC electrical energy and outputs the converted AC electrical energy to electric motor 106. In this case, relay 110 is turned on by final output destination determining section 109. The shaft of electric motor 106 is connected to the vehicle shaft of the driving wheels of vehicle 10, and the driving wheels of vehicle 10 rotate in accordance with the rotation of the shaft.

In addition, the electrical energy accumulated in storage cell 105 is used as power for operating, for example, accessory devices such as a car navigation apparatus and a car audio and electric components such as a power window, an ETC (registered trademark), and an electronic control unit (ECU) through DC/DC converter 104. In addition, the electrical energy accumulated in storage cell 105 may be accumulated in auxiliary battery 107 through to DC/DC converter 104. In such a case, DC/DC converter 104 performs voltage transformation of the DC electrical energy outputted from storage cell 105.

As above, the operations at the times of charging and discharging storage cell 10 have been described.

Subsequently, detailed operations of risk degree setting section 108 and final output destination determining section 109 will be described.

Risk degree setting section 108 includes a risk degree table illustrated in FIG. 2. In the risk degree table, the degrees of risk that are viewed from different viewpoints are illustrated, and risk degree setting section 108 sets each one of the inverter risk degree and the storage cell risk degree with reference to the risk degree table based on each viewpoint.

As described above, each one of the inverter risk degree and the storage cell risk degree is set based on the degree of decrease in the safety of vehicle 10 in a case where each one of electric components of inverter 103 and the storage cell 105 cannot withstand the load electrical energy of a high voltage and is damaged. Accordingly, in a case where the inverter risk degree is lower than the storage cell risk degree, final output destination determining section 109 determines inverter 103 as the final output destination of the electrical energy outputted from electric motor 106 such that the load of the electrical energy is applied to inverter 103. On the other hand, in a case where the storage cell risk degree is lower than the inverter risk degree, final output destination determining section 109 determines storage cell 105 as the final output destination of the electrical energy output from electric motor 106 such that the load of the electrical energy is applied to storage cell 105.

In addition, final output destination determining section 109 turns off relay 110 so as to set the final output destination of the electrical energy output from electric motor 106 as inverter 103 in a case where the inverter risk degree is lower than the storage cell risk degree and turns on relay 110 so as to set the final output destination of the electrical energy outputted from electric motor 106 as storage cell 105 in a case where the storage cell risk degree is lower than the inverter risk degree.

Here examples of setting risk degrees will be described. In the following setting examples, a case will be described in which each one of the inverter risk degree and the storage cell risk degree is relatively set to five levels of one to five. However, the levels of the risk degree are not limited to five levels, but any number of levels may be employed. As a definition of the risk degree, for example, risk categories defined in ISO 1200-1 may be applied.

Setting Example 1

Case Where Elapse Time Since Installation of Component in Vehicle 10 is Used as Viewpoint Inverter 103 and storage cell 105 each being an electric component degrade as the elapse time since installation of the components in vehicle 10 becomes longer (degradation over time), so that the power reception capacity, the permissible temperature, and the like decrease, and the degree of risk increases. Thus, risk degree setting section 108 sets each degree of risk to be higher as the elapse time since installation of the electric component in vehicle 10 becomes longer. Accordingly, for example, in the case illustrated in FIG. 2, risk degree setting section 108 sets the inverter risk degree to "3" and the storage cell risk degree to "1," whereby the storage cell risk degree is lower than the inverter risk degree. Therefore, final output destination determining section 109 determines the final output destination of the electrical energy outputted from electric motor 106 as storage cell 105 and turns on relay 110.

Setting Example 2

Case Where Permissible Temperature is Used as Viewpoint

Generally, the degree of risk of each electric component of inverter 103 or storage cell 105 increases as the temperature increases. Thus, risk degree setting section 108 sets each degree of risk to be higher as the permissible temperature is lower. Accordingly, for example, in the case illustrated in FIG. 2, risk degree setting section 108 sets the inverter risk degree to "2" and the storage cell risk degree to "3," whereby the inverter risk degree is lower than the storage cell risk degree. Therefore, final output destination determining section 109 determines the final output destination of the electrical energy outputted from electric motor 106 as inverter 103 and turns off relay 110.

Setting Example 3

Case Where Permissible Humidity is Used as Viewpoint

Generally, the degree of risk of each electric component of inverter 103 or storage cell 105 increases as the humidity increases. Thus, risk degree setting section 108 sets each degree of risk to be higher as the permissible humidity is lower. Accordingly, for example, in the case illustrated in FIG. 2, risk degree setting section 108 sets the inverter risk degree to "2" and the storage cell risk degree to "3," whereby the inverter risk degree is lower than the storage cell risk degree. Therefore, final output destination determining section 109 determines the final output destination of the electrical energy outputted from electric motor 106 as inverter 103 and turns off relay 110.

Setting Example 4

Case where Permissible Humidity is Used as Viewpoint

Generally, the degree of risk of each electric component of inverter 103 or storage cell 105 increases as the power reception capacity decreases. Thus, risk degree setting section 108 sets each degree of risk to be higher as the power reception capacity is lower. Accordingly, for example, in the case illustrated in FIG. 2, risk degree setting section 108 sets the inverter risk degree to "5" and the storage cell risk degree to "1," whereby the storage cell risk degree is lower than the inverter risk degree. Therefore, final output destination determining section 109 determines the final output destination of the electrical energy outputted from electric motor 106 as storage cell 105 and turns on relay 110.

Setting Example 5

Case where Current Resistance is Used as Viewpoint

Generally, the degree of risk of each electric component of inverter 103 or storage cell 105 increases as the current resistance decreases. Thus, risk degree setting section 108 sets each degree of risk to be higher as the current resistance is lower. Accordingly, for example, in the case illustrated in FIG. 2, risk degree setting section 108 sets the inverter risk degree to "4" and the storage cell risk degree to "2," whereby the storage cell risk degree is lower than the inverter risk degree. Therefore, final output destination determining section 109 determines the final output destination of the electrical energy outputted from electric motor 106 as storage cell 105 and turns on relay 110.

Setting Example 6

Case where Degree of Risk at Time of Leakage of Electricity is Used as Viewpoint Generally, while it is difficult to cut off a leakage of power from storage cell 105, a leakage of power from inverter 103 can be cut off by using an element provided in inverter 103. Thus, risk degree setting section 108 sets each degree of risk to be higher as the degree of risk at the time of leakage of electricity is higher. Accordingly, for example, in the case illustrated in FIG. 2, risk degree setting section 108 sets the inverter risk degree to "2" and the storage cell risk degree to "5", whereby the inverter risk degree is lower than the storage cell risk degree. Therefore, final output destination determining section 109 determines the final output destination of the electrical energy outputted from electric motor 106 as inverter 103 and turns off relay 110.

Setting Example 7

Case where Degree of Severity at Time of Damage is Used as Viewpoint

In a case where storage cell 105 is a nickel-hydride rechargeable battery, there is concern for the generation of hydrogen gas due to damage to storage cell 105, and accordingly, the damage to storage cell 105 has a high degree of influence on a human body. On the other hand, the damage to inverter 103 leads only to the stopping of vehicle 10 and thus has a degree of influence on the human body that is lower than that of the damage to storage cell 105. Thus, risk degree setting section 108 sets each degree of risk to be higher as the degree of severity at the time of damage is higher. Accordingly, for example, in the case illustrated in FIG. 2, risk degree setting section 108 sets the inverter risk degree to "2" and the storage cell risk degree to "5," whereby the inverter risk degree is lower than the storage cell risk degree. Therefore, final output destination determining section 109 determines the final output destination of the electrical energy output from electric motor 106 as inverter 103 and turns off relay 110.

Setting Example 8

Case where Connection Harness Resistance is Used as Viewpoint

Connection harness resistance is defined as a limit value of a current allowed to flow through each electric component, and the degree of risk of each electric component of inverter 103 or storage cell 105 increases as the connection harness resistance decreases. Thus, risk degree setting section 108 sets each degree of risk to be higher as the connection harness resistance is lower. Accordingly, for example, in the case illustrated in FIG. 2, risk degree setting section 108 sets the inverter risk degree to "4" and the storage cell risk degree to "2," whereby the storage cell risk degree is lower than the inverter risk degree. Therefore, final output destination determining section 109 determines the final output destination of the electrical energy outputted from electric motor 106 as storage cell 105 and turns on relay 110.

As above, Setting Examples 1 to 8 of the degrees of risk have been described.

In addition, Setting Examples 1 to 8 described above may be appropriately combined.

For example, in a case where Setting Examples 1 and 2 are combined, risk degree setting section 108 sets each degree of risk by adding the risk degrees of Setting Examples 1 and 2 as the inverter risk degree: 3+2=5 and the storage cell risk degree: 1+3=4, whereby the storage cell risk degree is lower than the inverter risk degree. Therefore, final output destination determining section 109 determines the final output destination of the electrical energy outputted from electric motor 106 as storage cell 105 and turns on relay 110.

As described above, according to this embodiment, the degree of risk for each electric component of inverter 103 or storage cell 105 is set in consideration of the characteristics of the electric component, and the final output destination of the electrical energy is determined based on the set degrees of risk. Accordingly, the electric component having a high degree of risk can be prevented from being damaged, whereby the safety of vehicle 10 is maintained so as to ensure user's safety.

The embodiment of the present invention has been described above.

Hereinafter, a variation of the embodiment of the present invention will be described.

Figure 3:
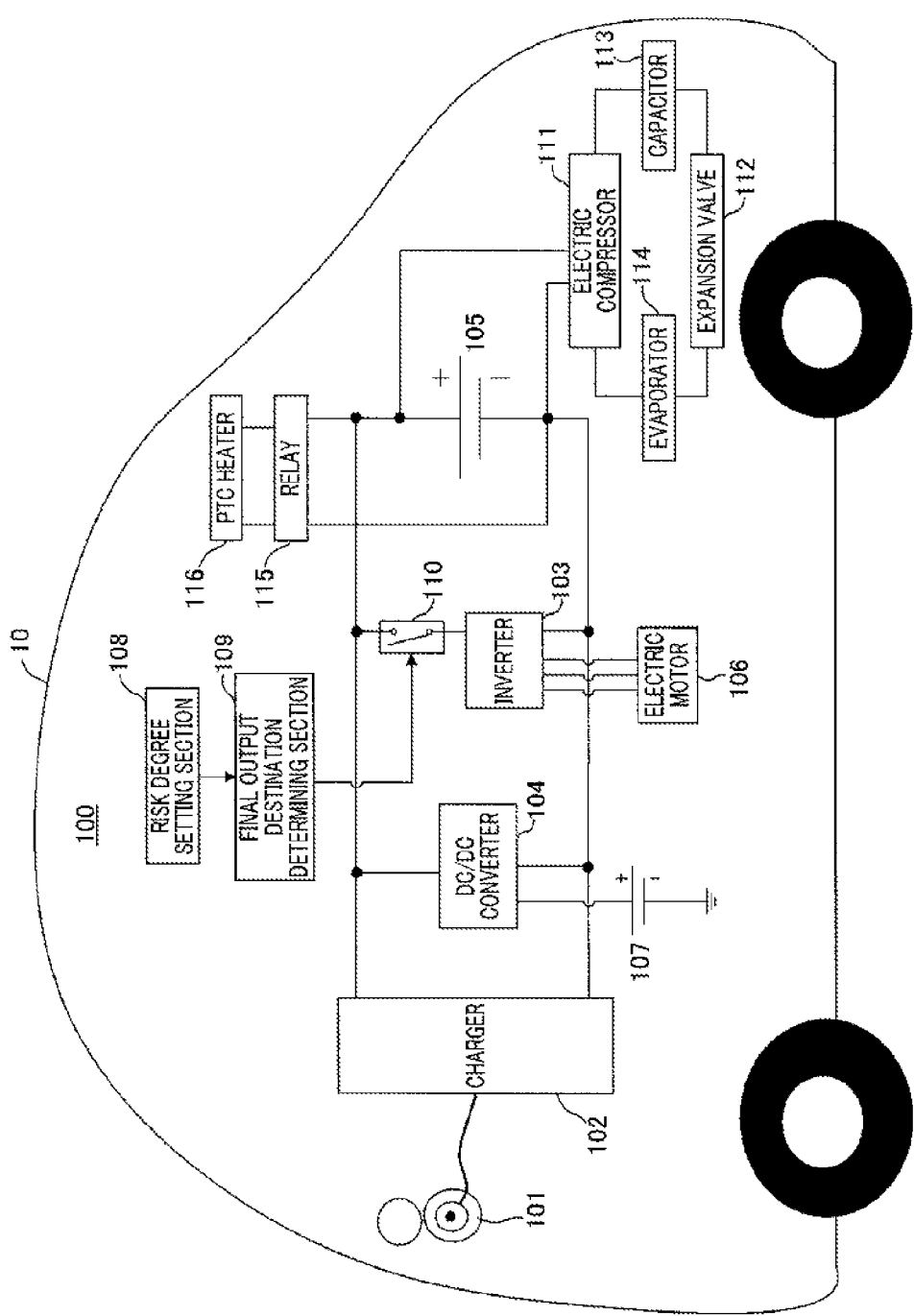
FIG. 3 is a block diagram that illustrates the configuration of a vehicle power supply apparatus according to a variation of an embodiment of the present invention.

First, a variation will be described with reference to FIGS. 3 and 4.

In the above-described embodiment, the electric component for which the degree of risk is set may be an electric compressor or a PTC heater. The configuration of vehicle power supply apparatus 100 according to this variation will be described with reference to FIG. 3. FIG. 3 is a block diagram that illustrates an example of the configuration of vehicle power supply apparatus 100 as a variation.

In addition to the configuration illustrated in FIG. 1, vehicle power supply apparatus 100 includes a cooling heat pump configured of electric compressor 111, expansion valve 112, capacitor 113, and evaporator 114. Electric compressor 111 is supplied with power from storage cell 105 and compresses refrigerant. Expansion valve 112 is a valve that cools refrigerant to low temperature by expanding the compressed refrigerant. Capacitor 113 and evaporator 114 perform heat exchange using the refrigerant and the air.

In addition, vehicle power supply apparatus 100 includes PTC heater 116 that is electrically connected from storage cell 105 through relay 115. PTC heater 116 is a type of heater using heating wires and has a function for generating heat that is necessary at the time of heating, detecting the peripheral temperature, and controlling the radiation amount.

In vehicle power supply apparatus 100 having such a configuration, risk degree setting section 108 calculates the degree of risk of electric compressor 111 or PTC heater 116 based on a risk degree table illustrated in FIG. 4. Final output destination determining section 109 calculates the risk degree for each one of a plurality of electric components and can determine an electric component having a minimum risk degree as a final output destination of the electrical energy.

<Risk of Electric Compressor 111>

The electric compressor can be determined as a final output destination of the electrical energy outputted from electric motor 106.

Even when electric compressor 111 is damaged, only the air adjusting function becomes no longer available, and the risk thereof is lower than that of the other components. In addition, for example, electric compressor 111 can consume maximum power of 6 kWh, and the power may be radiated as heat.

In addition, even when the number of rotations of a motor included in electric compressor 111 increases due to an input of high power, and the high pressure of the refrigerant thus increases too high, the refrigerant can be discharged to the outside of the vehicle so as to prevent any harm for a passenger by using a pressure relief valve (not illustrated in the drawing) provided in electric compressor 111 in advance or the like.

Furthermore, in a case where a large current is applied to electric compressor 111, an inverter (for example, an IGBT) controlling the motor included in electric compressor 111 is possibly damaged. However, usually, the electric compressor is a semi-sealed type, so that, even when the inverter is damaged, there is little influence on the outside of the electric compressor. Therefore, electric compressor 111 can be set as a distribution destination of the power.

<Risk of PTC Heater 116>

PTC heater 116 can be determined as a final output destination of the electrical energy outputted from electric motor 106. PTC heater 116 may be considered as a variable resistor in which the resistance value changes in accordance with the temperature.

Although the temperature of the inside of the vehicle rises when power is supplied to the vehicle, there is little influence on the passenger. When higher power is supplied, disconnection of the heating wire may be considered. However, usually, PTC heater 116, which is a type of device handling a high voltage, is insulated from the ground of the vehicle, so that, even when the disconnection occurs, only the circuit is open, and no current flows. Accordingly, PTC heater 116 can be set as a distribution destination for the power.

As above, a variation has been described with reference to FIGS. 3 and 4. Other variations will be further described as below.

For example, in the above-described embodiment, although the electric components for which the degrees of risk are set are two electric components including inverter 103 and storage cell 105, the degree of risk may be set also for DC/DC converter 104. In other words, risk degree setting section 108 may further set a risk degree (DC/DC converter risk degree) in a case where DC/DC converter 104 performs the voltage transformation process. In such a case, final output destination determining section 109 determines one of inverter 103, storage cell 105, and DC/DC converter 104, which has a lowest degree of risk, as the final output destination of the electrical energy outputted from electric motor 106.

In addition, the electric components for which the degrees of risk are set are not limited to inverter 103, storage cell 105, or DC/DC converter 104, and the degree of risk may be set for any electric component included in vehicle power supply apparatus 100. In other words, according to the present invention, final output destination determining section 109 determines one of a plurality of electric components included in vehicle power supply apparatus 100, which has a lowest degree of risk, as the final output destination of the electrical energy outputted from electric motor 106.

Furthermore, in the above-described embodiment, a description has been provided regarding the configuration of a case where electrical energy supplied from the power supply plug through the electrodes provided in lid portion 101 is AC, while assuming that household power supply is used (FIG. 1), for example. However, DC electrical energy of about 400 V is supplied from the power supply plug connected to a charging stand. Accordingly, in a case where charging using the charging stand is considered, charger 102 converting AC electrical energy into DC electrical energy can be provided in the charging stand, and accordingly, vehicle power supply apparatus 100 does not need to include charger 102. In addition, the transmission/reception of electrical energy between the household power supply or the charging stand and the charger 102 may be performed through non-contact charging using electromagnetic induction.

The above embodiment has been described with an example in which the present invention is implemented by hardware, but the present invention can be realized by software in combination with hardware.

In addition, the functional blocks used in the description of the embodiment are typically implemented as LSI devices, which are integrated circuits. The functional blocks may be formed as individual chips, or a part or all of the functional blocks may be integrated into a single chip. Although the term "LSI" is used herein, the terms including "IC," "system LSI," "super LSI" or "ultra LSI" may be used as well depending on the level of integration.

In addition, the circuit integration is not limited to LSI and may be achieved by dedicated circuitry or a general-purpose processor other than LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of the specification, drawings and abstract of Japanese Patent Application No. 2011-072274, filed on Mar. 29, 2011, is incorporated herein by reference in its entirety.

INDUSTRIAL APPLICABILITY

The present invention is suitable for a vehicle power supply apparatus included in a vehicle driven by electrical energy accumulated in a storage cell.

REFERENCE SIGNS LIST

10 Vehicle
100 Vehicle power supply apparatus
101 Lid portion
102 Charger
103 Inverter
104 DC/DC converter
105 Storage cell
106 Electric motor
107 Auxiliary battery
108 Risk degree setting section
109 Final output destination determining section
110 Relay
111 Electric compressor
112 Expansion valve
113 Capacitor
114 Evaporator
115 Relay
116 PTC heater

The invention claimed is:

1. A vehicle power supply apparatus to be installed in a vehicle, the apparatus comprising:
   an output section that outputs electrical energy;
   a plurality of electric components that process or accumulate the electrical energy;
   a setting section that sets a degree of risk for each of the plurality of electric components to process or accumulate the electrical energy; and
   a determination section that determines one of the plurality of electric components as a final output destination of the electrical energy based on the degree of risk for each of the plurality of electric components.

2. The vehicle power supply apparatus according to claim 1, wherein:
   the output section is an electric motor that converts kinetic energy generated during braking of the vehicle into alternate-current (AC) electrical energy and that outputs the AC electrical energy;
   the plurality of electric components include: an inverter that performs a conversion process in which the AC electrical energy is converted into direct-current (DC) electrical energy and that outputs the DC electrical energy; and a storage cell that accumulates the DC electrical energy;
   the setting section sets a first risk degree for the inverter to perform the conversion process and a second risk degree for the storage cell to accumulate the DC electrical energy; and
   the determination section determines the inverter as the final output destination of the electrical energy when the first risk degree is lower than the second risk degree and determines the storage cell as the final output destination of the electrical energy when the second risk degree is lower than the first risk degree.

3. The vehicle power supply apparatus according to claim 1, wherein:
the output section is an electric motor that converts kinetic energy generated during braking of the vehicle into alternate-current (AC) electrical energy and that outputs the AC electrical energy;
the plurality of electric components include: an inverter that performs a conversion process in which the AC electrical energy is converted into direct-current (DC) electrical energy and that outputs the DC electrical energy; a storage cell that accumulates the DC electrical energy; an electric compressor that compresses refrigerant; and a heater that radiates heat through electric conduction;
the setting section sets a first risk degree for the inverter to perform the conversion process, a second risk degree for the storage cell to accumulate the DC electrical energy, a third risk degree for the electric compressor to accumulate the DC electrical energy; and a fourth risk degree for the heater to accumulate the DC electrical energy; and
the determination section determines one of the electric components which has a lowest risk degree among the first to fourth risk degrees, as the final output destination of the electrical energy.

4. The vehicle power supply apparatus according to claim 1, wherein the setting section sets the degree of risk based on an elapse time since installation of each of the plurality of electric components in the vehicle.

5. The vehicle power supply apparatus according to claim 4, wherein the longer the elapse time since installation of the electric component in the vehicle is the higher the degree of risk the setting section sets.

6. The vehicle power supply apparatus according to claim 1, wherein the setting section sets the degree of risk based on at least one of a permissible temperature, a permissible humidity, and a power reception capacity of each of the plurality of electric components.

7. The vehicle power supply apparatus according to claim 6, wherein the smaller the power reception capacity is, the higher the degree of risk the setting section sets.

8. The vehicle power supply apparatus according to claim 1, wherein the setting section sets the degree of risk based on at least one of current resistance and connection harness resistance of each of the plurality of electric components.

9. The vehicle power supply apparatus according to claim 8, wherein the smaller the current resistance is, or the smaller the connection harness resistance is, the higher the degree of risk, the setting section sets.

10. The vehicle power supply apparatus according to claim 1, wherein the setting section sets the degree of risk based on at least one of a degree of risk at the time of leakage of electricity and a degree of severity at the time of damage for each of the plurality of electric components.

11. The vehicle power supply apparatus according to claim 10, wherein the higher the degree of risk at the time of leakage of electricity is, or the higher the degree of severity at the time of damage is, the higher the degree of risk the setting section sets.

* * * * *